March 16, 1954
G. WALTERS
2,672,163
MEANS FOR AND METHOD OF MAKING
WOVEN-ENDLESS TUBULAR FABRIC
Filed April 25, 1951
5 Sheets-Sheet 1
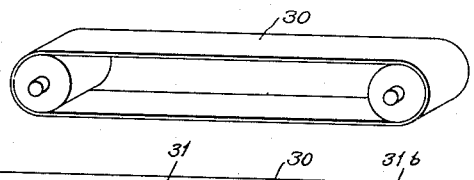
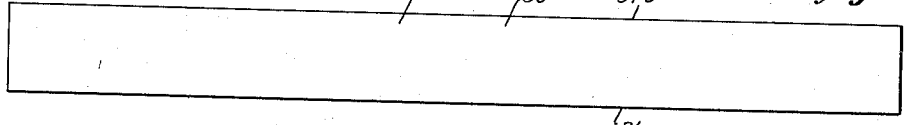
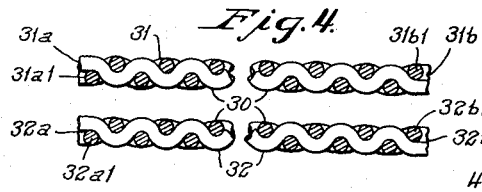
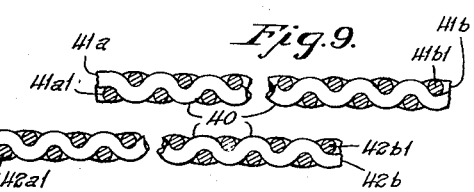
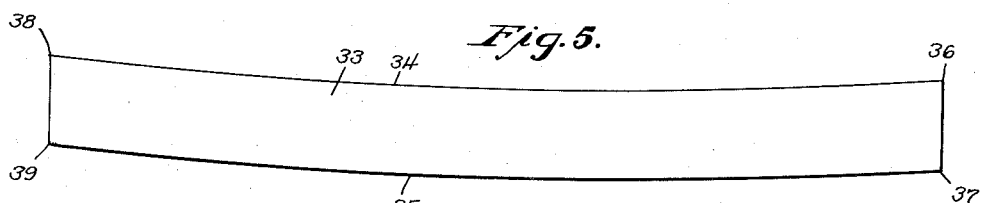
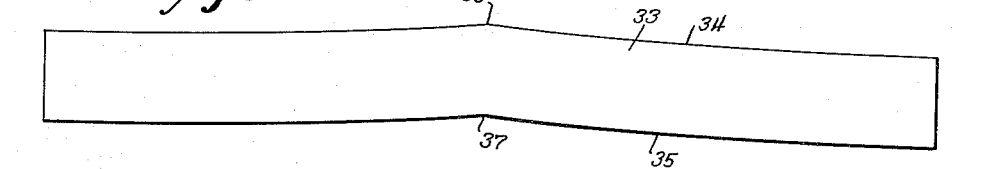
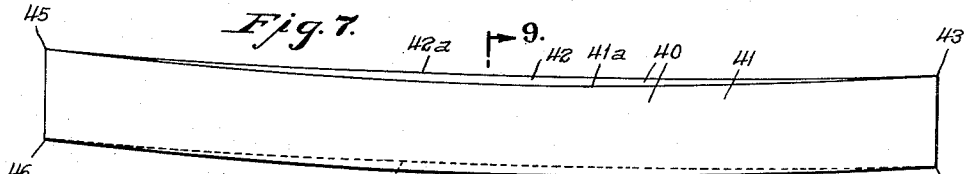
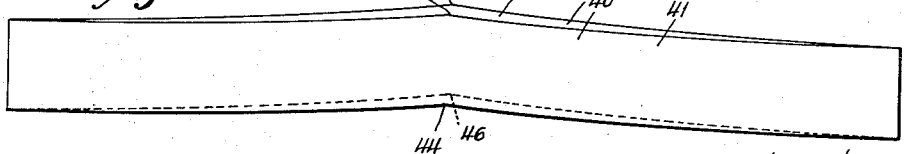
Inventor
Gustav Walters
By Earle & Sturnick
Attorneys

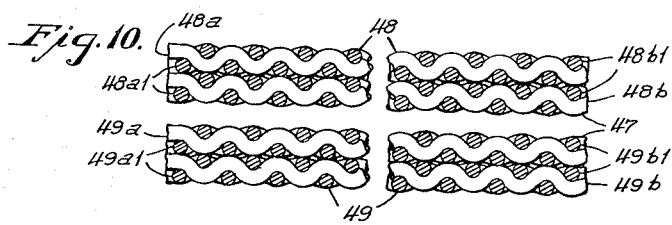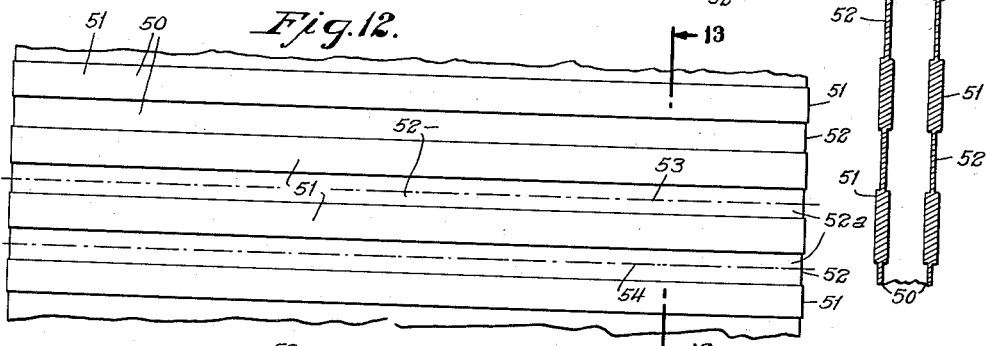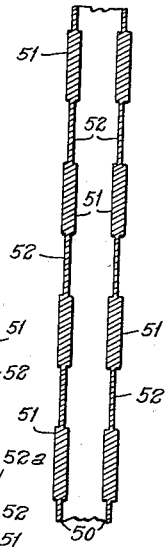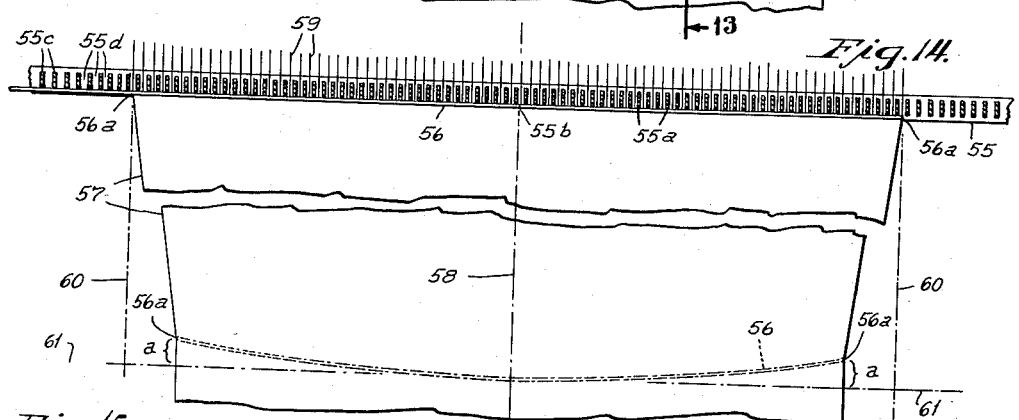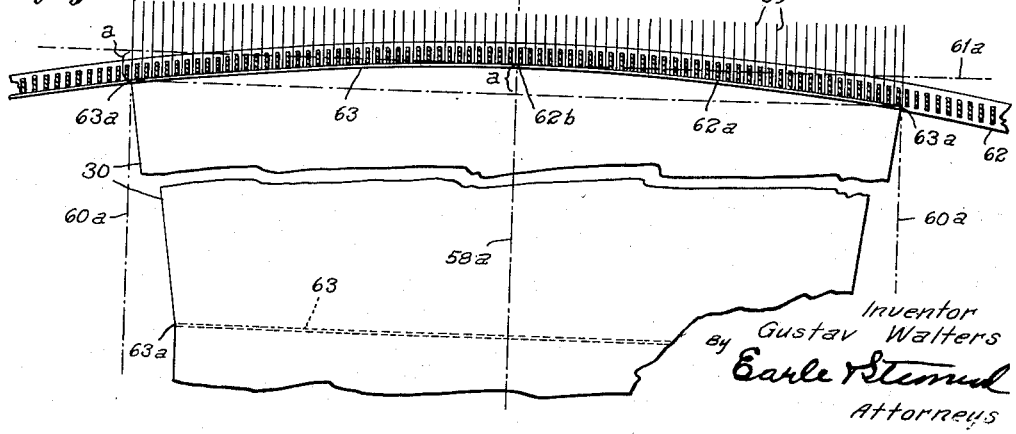

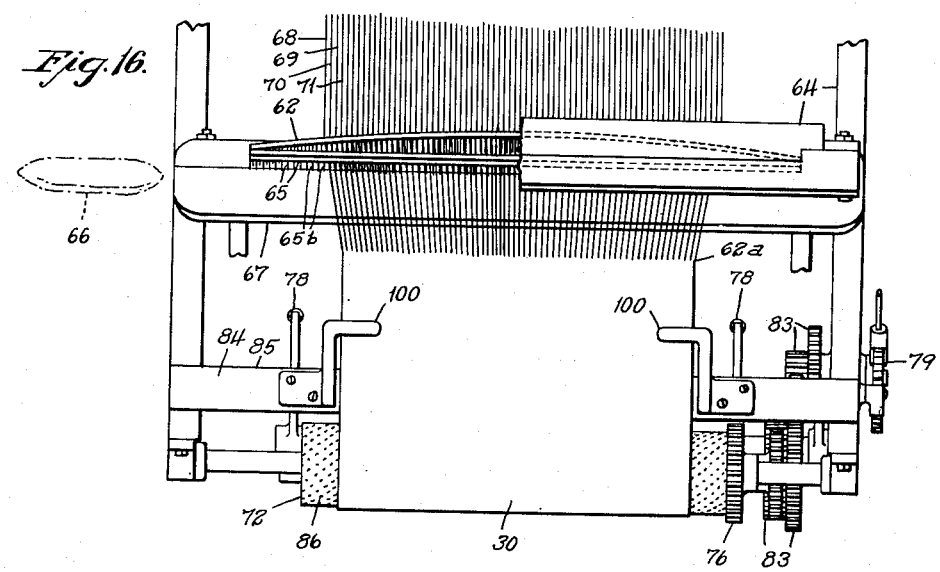
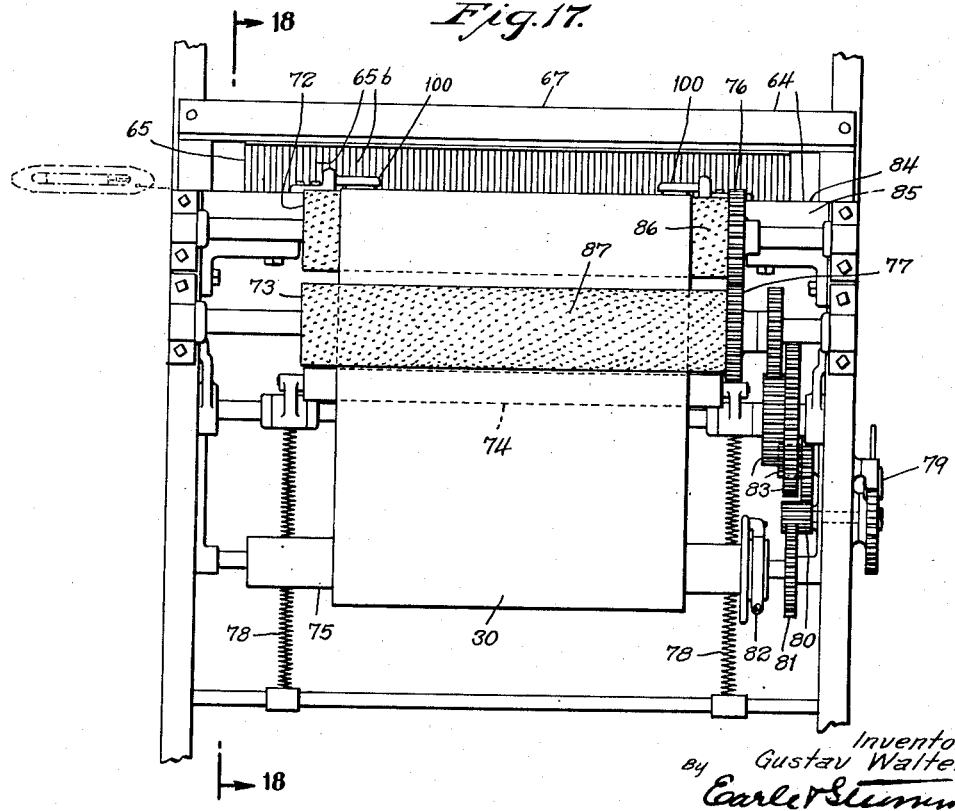

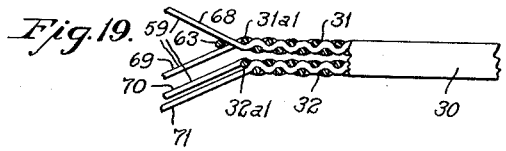
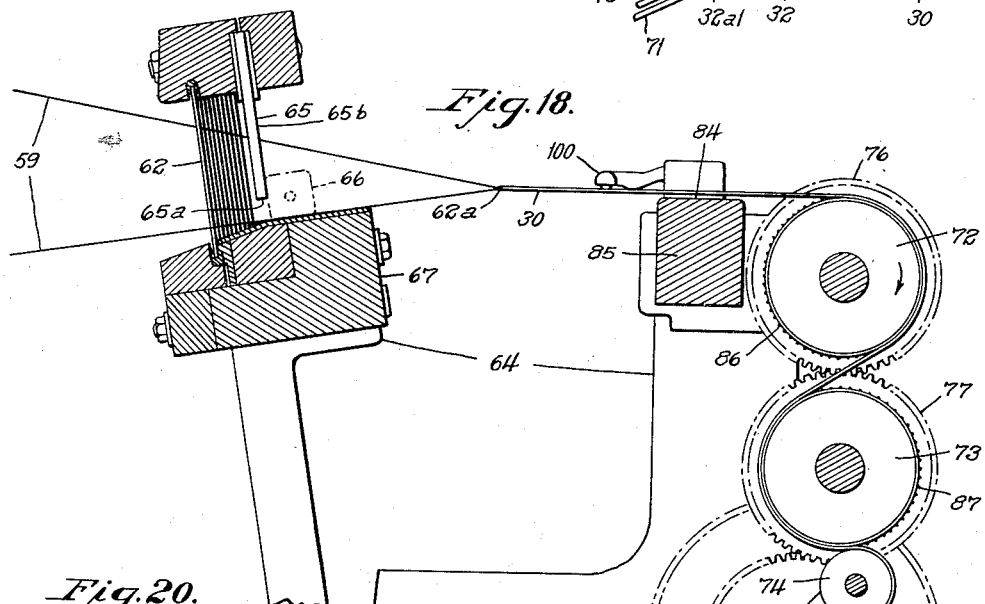
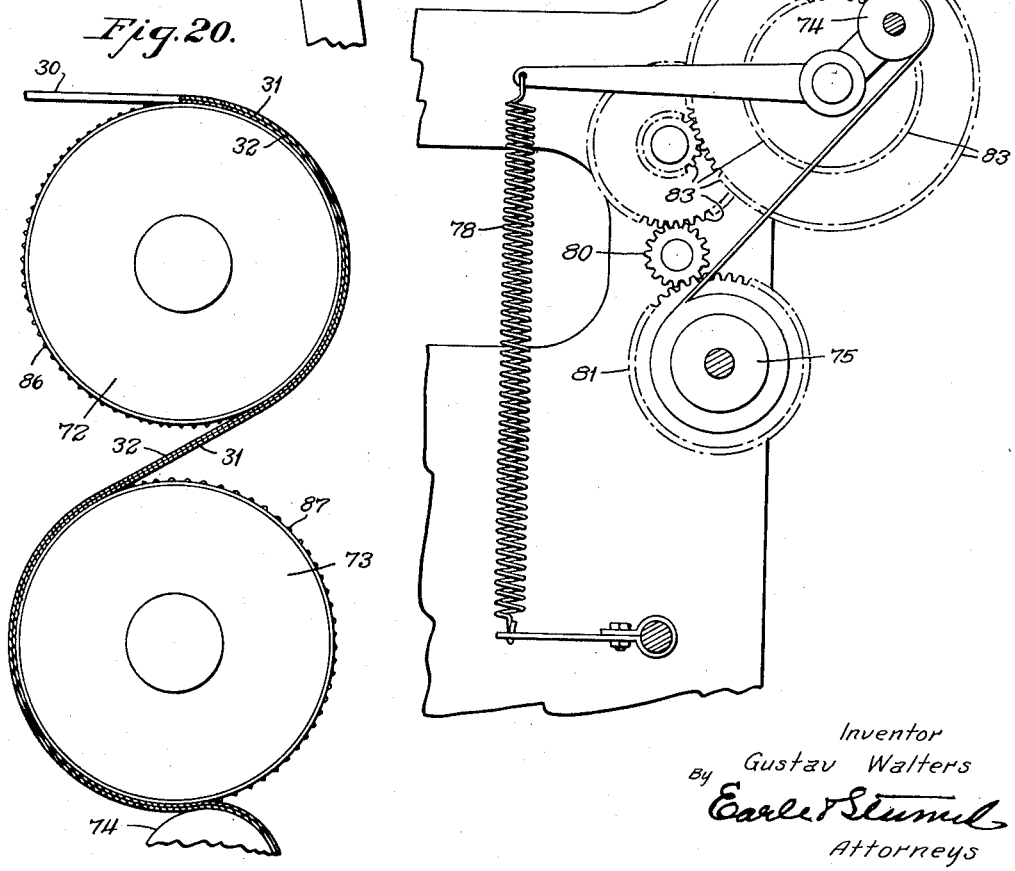

March 16, 1954 G. WALTERS 2,672,163
MEANS FOR AND METHOD OF MAKING
WOVEN-ENDLESS TUBULAR FABRIC
Filed April 25, 1951 5 Sheets-Sheet 5
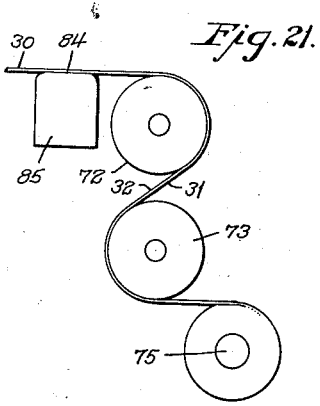
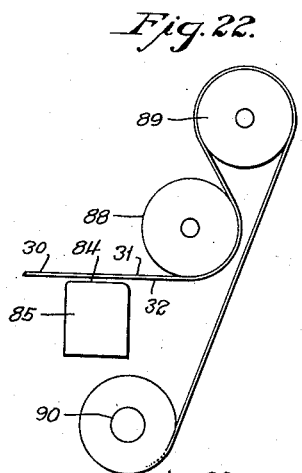
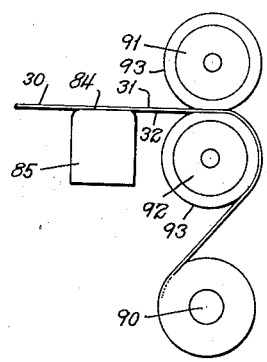
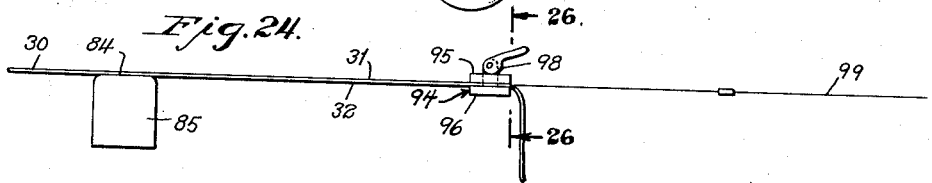
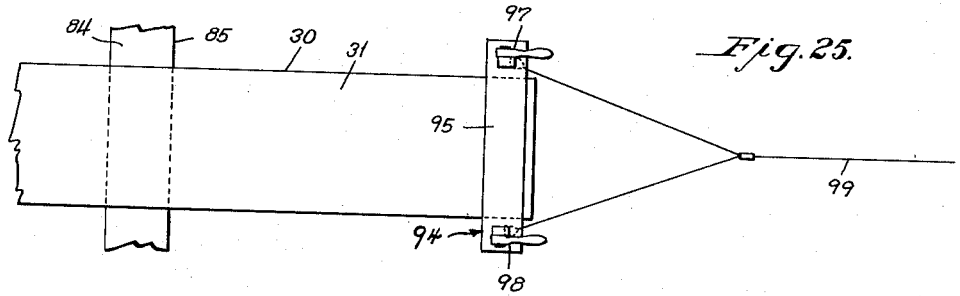
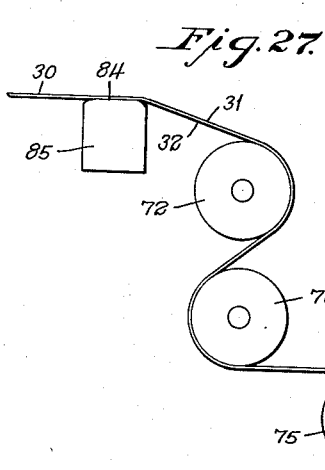
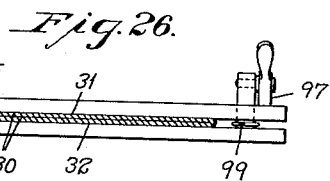
Inventor
Gustav Walters
By
Attorneys Patented Mar. 16, 1954

2,672,163

UNITED STATES PATENT OFFICE 2,672,163

MEANS FOR AND METHOD OF MAKING WOVEN-ENDLESS TUBULAR FABRIC

Gustav Walters, Middletown, Conn.

Application April 25, 1951, Serial No. 222,772

9 Claims. (Cl. 139—116)

This invention relates to improved means and methods of making woven-endless tubular fabric, and more particularly, woven-endless tubular fabric which is to be used as belts for pulley-travel mechanical purposes, such as drive belts, conveyor belts and abrasive belts, abrasive belts being those which have an abrasive adhered thereto for polishing, abrading, etc.

Heretofore, in the weaving of woven-endless tubular fabric, such fabric has possessed two very serious defects when it is to be employed for belts for mechanical purposes, and particularly drive belts which have to run at high speed. One of these serious defects resides in the fact that although the picks at the time they are woven at the weave-location or beat-up location, are substantially straight across the width of the upper and lower layers of the flattened double-layered tube as woven, when the fabric progresses along during the weaving and has shrunk in width to its normal width or tubular size and is finally wound up as a finished flattened tube on the blocking roll, it is found that the picks are no longer straight, but actually are curved, and this produces the very serious defect, particularly in the case of woven-endless high-speed belts, of causing two pointed portions projecting outward edgewise from one edge, and corresponding opposite depressions projecting inward edgewise from the opposite edge of a belt made of such woven-endless tubular fabric, with the result that such belts run unevenly, and under uneven stresses applied to the driven pulley, cause such belts to be thrown off the pulleys. Also, the uneven running of such a belt results in an uneven scuffing and wearing action on the belt, and causes shocks to the driven pulley with consequent damage to fine or accurate work, for example, being ground on a high-speed grinding machine driven by such a belt.

Another serious defect of such tubular fabric as heretofore woven, resides in the fact that although a given pick in the upper layer of the fabric is superposed above a corresponding pick in the lower layer at the weave-location or beat-up location, nevertheless, by the time that such initially superposed picks reach the prior-art take-up means, they are no longer superposed, but one lags behind or is seriously offset or displaced to the rear, relative to the other, and this also brings about serious defects in woven-endless belts, especially where the belts are to be employed for high-speed use. Thus, where the picks in one layer of fabric lag behind the corresponding picks in the other layer of fabric during the weaving and feeding or take-up operation, the picks in the lagging-behind layer of fabric will be beaten up closer together than in the other layer, and, at times, the lagging-behind layer will have tucks thrown into it by the beat-up and shedding actions at the weave-location, to thus introduce an additional serious defect into the fabric, as well as to produce a narrower width in a belt made from such fabric inasmuch as a belt must always be cut from the fabric along the picks all around the tubular material. This means that such a belt is wider at some places than at other places, with the result that such a belt will flutter and run untrue and cause shocks to the driven pulley, and in consequence transmit such shocks to the grinding wheel of a grinder, and spoil delicate or accurate work being ground. And where both of the foregoing described defects are present in a given high-speed belt, this causes a maximum of troubles of the types hereinbefore described.

It is one object of this invention, therefore, to produce woven-endless tubular fabric in which the picks extend in substantially straight lines across each of the layers of the finished woven tubular fabric after it has shrunk to its normal relaxed width.

Another object of this invention is to produce woven-endless tubular fabric in which the corresponding portions of the superposed layers are not only superposed at the weave-location, but are substantially retained in their superposed relation during their travel to the take-up means.

Another object of this invention is to produce woven-endless tubular textile fabric in which the picks extend in substantially straight lines across each of the superposed layers of the relaxed fabric, in combination with the corresponding portions of the superposed layers of fabric being in substantially superposed relation during their travel to the take-up means.

With the above and other objects in view, as will appear to those skilled in the art from the present disclosure, this invention includes all features in said disclosure which are novel over the prior art.

In the description and claims, various parts and steps are identified by specific terms for convenience, but they are intended to be as generic in their application as the prior art permits.

In the accompanying drawings forming part of the present disclosure, in which certain ways of carrying out the invention are shown for illustrative purposes:

Fig. 1 is a perspective view illustrating a woven-endless tubular fabric or belt made in accordance with the present invention, and mounted on a pair of pulleys;

Fig. 2 is an enlarged top plan view of the belt or tubular fabric illustrated in Fig. 1;

Fig. 3 is a front elevation of Fig. 2;

Fig. 4 is an enlarged sectional view on line 4—4 of Fig. 3;

Fig. 5 is a top plan view similar to Fig. 2, of a prior-art tubular fabric in which the picks are curved instead of straight;

Fig. 6 is a top plan view of the tubular fabric shown in Fig. 5, but with the right-hand end of the fabric as shown in Fig. 5 moved to the left to the top-center position of Fig. 6;

Fig. 7 is a top plan view similar to Fig. 5 of a prior-art tubular fabric which not only has the defective curved picks of Fig. 5, but also has the picks of the two layers which should be superposed, actually offset;

Fig. 8 is a top plan view of the fabric shown in Fig. 7, but with the right-hand end of the fabric as shown in Fig. 7 moved to the left to the top-center position of Fig. 8;

Fig. 9 is an enlarged sectional view on line 9—9 of Fig. 7;

Fig. 10 is an enlarged sectional view similar to Fig. 4, of a two-ply construction of fabric;

Fig. 11 is an edge elevation of another modified construction of tubular fabric;

Fig. 12 is a top plan view of Fig. 11;

Fig. 13 is an enlarged sectional view on line 13—13 of Fig. 12;

Fig. 14 is a schematic top plan view of an ordinary straight reed, and illustrating the objectionable curved picks or wefts produced thereby in the finished fabric;

Fig. 15 is a schematic top plan view similar to Fig. 14 of my improved curved reed, and illustrating the straight picks or wefts produced thereby in the finished fabric;

Fig. 16 is a top plan view of the construction shown in Figs. 17 and 18, showing a portion of my improved weaving means or loom with my improved curved reed mounted therein, together with certain other improvements to be later described;

Fig. 17 is a front elevation of Fig. 16.

Fig. 18 is an enlarged sectional view on line 18—18 of Fig. 17;

Fig. 19 is an enlarged schematic view at and adjacent the weave-location of Fig. 18, showing the two layers of the tubular fabric, and the warps and wefts;

Fig. 20 is an enlarged view similar to Fig. 18, of the take-up rolls shown at the right of Fig. 18;

Fig. 21 is a view similar to Fig. 18, of a modified form of take-up construction;

Fig. 22 is a view similar to Fig. 21, of another modified form of take-up construction;

Fig. 23 is a view similar to Fig. 21, of another modified form of take-up construction;

Fig. 24 is a view similar to Fig. 21, of another modified form of take-up construction;

Fig. 25 is a top plan view of Fig. 24;

Fig. 26 is a sectional view on line 26—26 of Fig. 24; and

Fig. 27 is a view similar to Fig. 21, of still another modified construction of take-up mechanism.

Referring to Figs. 1 to 4 of the drawings showing the form of the invention illustrated therein, the belt or fabric 30 is woven endless in the form of a flattened tube consisting substantially of an upper or face layer 31 and a lower or back layer 32. The opposite side edges 31a, 31b, of the upper layer 31 have the picks 31a1 and 31b1 extending therealong, and the side edges 32a, 32b of the lower layer 32 have the picks 32a1 and 32b1 extending therealong, and the belt 30 has two important characteristics. One is that the side edges thereof are substantially straight, and the other is that the corresponding picks such as 31a1 and 32a1 respectively of the upper and lower layers of the endless belt 30, are substantially in superposed or vertical relation as in Fig. 4, as is also true of the picks 31b1 and 32b1, and of all the corresponding picks in between, and that the belt is therefore of uniform width throughout.

Referring to the form of the prior art belt 33 illustrated in Figs. 5 and 6, it will be noted that the opposite edges 34 and 35 thereof, while they are parallel to one another, are not straight, but rather are curved edgewise as illustrated in Fig. 5. This curvature, when viewed after the top layer of the belt has been slid to the left one-quarter of the belt length, so as to bring the points marked 36 and 37 at the right of Fig. 5, to the center of the top layer of Fig. 6, illustrates in exaggerated form, a very serious defect of woven-endless belts as heretofore made. In this shifting of the position of the belt from that shown in Fig. 5 to that in Fig. 6, the points 38 and 39 at the left end of Fig. 5, come to the center of Fig. 6 in the lower belt layer respectively immediately below the points 36 and 37 of the upper layer, so that they are not seen in Fig. 6.

Referring to the form of the prior art belt illustrated in Figs. 7, 8 and 9, the belt 40 not only has the side edges 41a and 41b of the upper layer 41 curved similar to the side edges 34 and 35 of the belt of Fig. 5, but also has the side edges 42a and 42b of the lower layer 42 similarly curved but to a different degree so that the corresponding upper and lower side edges are not superposed as they are in Fig. 5. And when the right-hand points 43 and 44 are moved to the left to the middle of the upper layer of the belt to the position shown in Fig. 8, and the left-hand points 45 and 46 correspondingly move to the right to their center positions as part of the lower or under layer 42, they do not come directly under the points 43 and 44, but are transversely displaced from them as shown. In other words, the edge pick 41a1 (Fig. 9) of the edge 41a and the edge pick 41b1 of the edge 41b, as also is true of all the in-between picks of the upper layer 41, are not respectively located in superposed relation over the corresponding picks 42a1 and 42b1, etc., of the lower layer 42, as they originally were when at the weave-location. Thus, the form of prior art construction illustrated in Figs. 7 to 9, combines two serious defects in woven-endless belts that applicant has overcome, as will hereinafter be more fully set forth.

In the modified construction illustrated in Fig. 10, a two-ply woven-endless belt construction 47 is shown similar to the one-ply belt construction illustrated in Fig. 4. The belt 47 has the two picks 48a1 along the edge 48a of the upper layer 48 superposed with regard to each other and to the two picks 49a1 along the edge 49a of the lower layer 49, and similarly has the two picks 48b1 along the opposite edge 48b of the upper layer 48 superposed with regard to each other and to the two picks 49b1 along the edge 49b of the lower layer 49.

In the modified construction illustrated in Figs. 11 to 13, a form of woven-endless fabric 50 is illustrated which includes successive thick portions 51 and thin portions 52 so that in this form of construction a plurality of belt-sections are provided, the thin portions of which can be cut longitudinally through their center region as indicated at the dotted lines 53 and 54, etc., in order to provide a belt or belt-section having a thick main or center member or portion 51 and two thin side portions 52a, each thick central portion 51 and its thin side portions 52a forming a belt-section which can be finished into a belt in any desired way known to those skilled in the art. The thick central portion may be single ply of heavy strands or multi-ply of thinner strands, as desired, and the thin portions will ordinarily be formed of thin warp strands and thin weft strands or picks.

The curved side edges and wefts of the woven-endless belt or fabric illustrated in Figs. 5 and 6, result from employing a straight reed in the weaving loom or other weaving means. The reason for this will be explained in connection with Fig. 14, in which is illustrated a straight reed 55 which has a beat-up face 55a, which also may be referred to as the beat-up location or weave-location or fell, which is also the location of the last-woven pick 56 of the fabric 57 being woven. The center point 55b of the beat-up face 55a of the reed 55 is also the center point 55b of the pick 56, and also lies on the longitudinal center line 58 of the fabric 57 being woven. Fragmental portions of warps 59 are illustrated in connection with the reed 55 which has dents 55c, and dent-spaces 55d between the dents, through which the warps 59 extend. At the time that the pick or weft 56 is beaten up into the fabric 57, the fabric is held out in its widest position under sidewise tension by means of what are known in the art as temples, hereinafter shown and described in connection with Figs. 16 to 18. As successive picks are beaten up, and the resulting woven fabric is pulled or fed away from the beat-up reed 55 and away from the temples, the woven fabric contracts or becomes narrower, and finally after it is wound up on the blocking-roll (to be later shown and described), it has reached its final narrow or relaxed width, and when this occurs, it is found that each of the opposite ends 56a of the pick 56 which were initially immediately adjacent the reed 55, has moved from its tensioned position at the weave-location 55a in the tensioned fabric, transversely of the fabric inwardly from the position of each of the two reference-lines 60, and rearwardly from the reference-line 61, a distance a. And similarly, other points (not shown) of the pick 56 inwardly of the ends 56a, will move distances less than a back from reference-line 61, depending on how far the points were originally in toward the center 55b of the pick 56, thus causing the pick 56 in the final relaxed position in the relaxed fabric to be on the arc of a curve as schematically illustrated in Fig. 14. The reference-lines 60 extend through the end-points 56a of the pick 56, in directions parallel to the longitudinal center line 58 of the fabric being woven, and parallel to the direction of feed or travel of the fabric, and are at right angles to the beat-up face 55a of the reed 55. The reference-line 61 schematically represents the position of the beat-up face 55a of an imaginary reed 55, in relation to the pick 56 after the pick 56 has contracted and taken the form of a curve as illustrated in Fig. 14.

I have discovered that if instead of making the reed straight as at 55 in Fig. 14, it is made as a curved reed 62 having a curved beat-up face 62a of a particular curvature to be hereinafter explained, the picks of the fabric 30 woven thereby, will not be substantially curved in the final relaxed fabric, but will be substantially straight. The curved beat-up face 62a may be referred to as the beat-up location or weave-location or fell, which also is the location of the last woven pick 63. The center 62b of the face 62a is shown in Fig. 15. By laying off the distance a forward to a point 63a along each of the two reference-lines 60a; from the reference-line 61a which is at right angles to the reference-lines 60a and passes in contact with the center 62b of the front face 62a of the curved reed 62 (to be made), and by having the curvature of the front face 62a of the reed 62 made of the curvature of a circular arc passing through the center point 62b and the two points 63a, which are also the ends of the pick 63, then when the pick 63 is beaten up in curved form by this reed 62, and has moved forward and shrunk sidewise in a similar manner to that illustrated concerning the pick 56 in Fig. 14, then the ends 63a of the pick 63 shown in curved form along the curved face 62a of the reed 62, will move to the inward position shown, and rearward the previously referred to distance a, and other parts of the pick 63 will correspondingly move inward and rearward, so that the entire pick 63 will now lie in a straight line. The center point 62b of the beat-up face 62a of the reed 62 is also the center point 62b of the pick 63, and also lies on the longitudinal center line 58a of the fabric 30 being woven, so that the line 58a of Fig. 15 corresponds to the line 58 of Fig. 14. And the reference-lines 60a of Fig. 15, correspond to the reference-lines 60 of Fig. 14.

The straight reed 55 of Fig. 14 and the fabric 57 woven thereby and parts thereof, may be referred to in the claims as a test-reed, a test-fabric, etc., and the curved reed 62 of Fig. 15, and the fabric 30 woven thereby, and parts thereof, may be referred to in the claims as a production-reed, a production-fabric, etc.

In the weaving loom or means 64 illustrated in Figs. 16 to 20, the curved beat-up reed 62 as shown and described in Fig. 15 is employed. In front of the curved reed 62, a straight guide-comb 65 is mounted to serve as a straight-across guide for the shuttle 66 which carries the weft-thread during the weaving operation of producing a single-ply plain woven endless fabric such as 30 illustrated in Figs. 1 to 4 and 15. In weaving this type of fabric, a single shuttle can be employed, and as the shuttle passes across from the left to the right of the machine (Figs. 16, 17, 18), the weft is laid as a pick in the upper or face layer 31 of the endless tubular fabric being woven, and in passing back from right to left, it passes through the lower or back layer 32, to lay the weft strand as another pick in the fabric, as a continuous strand which forms the picks as elements of a helix of flattened form in the tubular fabric woven in flattened form and substantially consisting of the two flat upper or face and lower or back layers. After each passage of the shuttle to lay in a pick, the batten 67 swings forward to beat up the pick into the cloth being woven, and by having the lower ends 65a of the teeth 65b of the guide comb 65 stop well short of reaching down to the fabric, as shown in Fig. 18, the teeth 65b do not interfere with the beat-up operation, and by having the lower ends 65a suitably rounded, they permit the warps to be moved freely upward past the ends 65a during the shedding of the warps. Where a multi-ply fabric is being woven, such as illustrated in Fig. 10, or a fabric employing alternately heavy and thin wefts, or multi-ply thick portions and thin portions even though the weft be the same size in all parts of the fabric, as described in connection with Figs. 11 to 13, more than one shuttle may be employed, as is well understood by those skilled in the art. Temples 100 mounted on the breast beam 85 or other fixed part of the loom, are employed to hold the fabric being woven, out in its widest position under sidewise tension as is understood by those skilled in the art.

In the claims, the term endless weft strand or strands is used in its sense as understood by those skilled in the art, that is, that although a weft strand is ordinarily of indefinitely great length except when it breaks during weaving, or when it is started to weave a different size of weft strand, it is not necessary to have it of indefinitely great length if the picks constituting a weft strand or strands is constituted of weft strands a majority of which are long enough to form at least three successive picks of the helix referred to in weaving a tubular fabric, so that the tubular fabric will have ample strength along the locations of the beginning and end of the picks.

Referring to Fig. 19 which shows an enlarged portion of the tubular fabric 30 of Figs. 1 to 4 and 15 being woven (Figs. 16 to 18), the upper and lower layers 31 and 32 of the tubular fabric 30 have the superposed picks 31a1 and 32a1 as part of the last-completed portion of the woven fabric 30, and has the four warps or sets of warps 68, 69, 70 and 71 occupying the positions shown in Fig. 19, so that warps 68 and 69 form a shed for the upper layer 31, in which is passed or laid a pick 63 in the upper layer 31. After this pick is beaten up, the warps 69 and 71 will be swung to their upper angular positions (not shown) to thus form a shed between the warps 70 and 71 in which the next travel of the shuttle will deposit a pick (not shown) in the lower layer 32 being formed. This completes a cycle, whereupon the warps 68 and 71 will be moved down to their lower angular positions and the warps 69 will be swung up to their upper angular position similar to that occupied by warps 68 in Fig. 19. And this procedure continues on in a way well understood to those skilled in the art, until the desired quantity of tubular fabric is woven.

The woven tubular fabric 30 is pulled away or fed to the right of Fig. 18 from the weave location 62a as fast as the weaving takes place, by means of a pair of take-up rolls 72 and 73, a presser-roll 74 and blocking roll 75. The take-up rolls 72 and 73 are driven by their respective gears 76 and 77 so that the surface speeds of the rolls 72 and 73 are the same, but in opposite directions. The presser roll 74 is normally spring pressed by means of the spring 78. Pawl and ratchet mechanism 79, actuated by the forward and backward swinging movement of the lay or batten 67 drives the blocking roll 75 through the gears 80 and 81 and the slip-friction clutch 82, and drives the lower take-up roll 73 through the gearing 83, and the take-up roll 73, in turn, drives the upper take-up roll 72 through the previously mentioned gears 76 and 77.

In order to avoid any slippage of the woven fabric or any layer of the woven fabric as it is pulled by the take-up rolls 72 and 73, the upper surface 84 of the breast beam 85 is preferably located below the path of travel of the woven fabric on its way to the take-up roll 72 so as to avoid any substantial drag upon the breast beam. Also, the take-up roll 72 has its surface formed or provided with a roughened anti-slip or gripping surface 86 and the take-up roll 73 is provided with a roughened anti-slip or gripping surface 87. During the weaving of the tubular fabric 30 in the form of two superposed layers 31 and 32, the fabric is heavily pulled upon by the take-up roll mechanism just described, and in addition to avoiding any substantial drag on the top surface of the breast beam 85, I have found that it is desirable when employing take-up rolls of the nature hereinbefore shown and described, to have the lower layer 32 pass over and be gripped by the rough surface of the first or top take-up roll 72 and to have the top layer 31 of the fabric gripped by the rough surface of the second or lower take-up roll 73, in order that the superposed picks 31a1, 32a1, etc. of the two layers of fabric (see Figs. 4 and 19) may be maintained in substantially superposed relation throughout their travel from the weave location 62a, to and over the take-up rolls.

If desired, the spring-pressed presser-roll 74 could be omitted by locating the blocking roll 75 in the position shown in the modified construction in Fig. 21 so as to give ample extent of engagement of the fabric with the lower take-up roll 73.

In the modified construction shown in Fig. 22, a pair of take-up rolls 88 and 89 are shown above and to the right of the breast beam 85, the top surface 84 of which breast beam is below the path of travel of the tubular web 30. It will be noted that the upper layer 31 of the tubular web 30 is gripped by the first take-up roll 88 instead of the lower layer being gripped thereby, as in the case of the first take-up roll 72 in Fig. 21, but this is all right since the web 30 has no drag or no substantial drag on the breast beam 85 or other part of the weaving loom. The web 30 is wound upon the blocking roll 90 similar to that heretofore described.

In the form of the invention illustrated in Fig. 23, a pair of upper and lower take-up rolls 91 and 92 each is provided with a resilient rubber covering or layer 93, and are driven at the same speeds and each engages one of the two layers of the webbing 30 to pull the latter away from the weave location. And, in this case, it will be noted that the webbing 30 drags only slightly over the top surface of the breast beam 85.

In the form of the invention illustrated in Figs. 24 to 26, the tubular webbing 30 also drags only slightly along the top surface of the breast beam 85 and is pulled by a clamp 94 which has two clamp bars 95 and 96 pressed into gripping engagement respectively with the upper and lower layers 31, 32 of the tubular webbing 30 by means of the cams 97 and 98. In order to feed or pull the tubular fabric 30 away from the weave-location of the weaving means, the clamp 94 may be pulled by a rope 99 or any other suitable means, and after the clamp 94 is pulled as far as is feasible, the loom can be stopped, the clamp removed and re-clamped at a place nearer the weave-location, whereupon the rope 99 can again be pulled by any desired means to pull upon it to feed the woven tubular fabric 30 forward from the weave-location in synchronized relation with the beat-up action of the batten as is well understood by those skilled in the art.

In the form of the invention illustrated in Fig. 27, the tubular fabric 30 is dragged heavily over the upper surface 84 of the breast beam 85 as shown by the angle of the fabric 30 as it passes beyond the breast beam 85 and thereupon passes over the take-up rolls 72 and 73 and thence onto the blocking roll 75, all similar to that set forth in connection with the showing of Fig. 21, except that the rolls 72, 73 and 75 are lower down so that there is a rather heavy drag of the lower layer of the tubular fabric 30 over the top surface of the breast beam 85. The form of feed of the tubular fabric illustrated in Fig. 27 is not a preferred form, inasmuch as it is preferable that the woven fabric should not drag substantially over the breast beam or any other fixed part of the weaving loom or means, but is shown in order to illustrate the point that where the tubular fabric drags heavily over the breast beam or other fixed part of the weaving loom or means and where the take-up means comprises two take-up rolls over which the fabric successively passes in being pulled by such take-up rolls, it is important that the first of the two take-up rolls over which the fabric passes, shall engage the layer of fabric which directly drags heavily on the breast beam or the like, in order to minimize the creep or slip of that layer to the rear, relative to the top layer of the fabric. This would give a certain portion of the advantage of this invention insofar as it applies to the feeding and maintaining of the corresponding portions of the superposed layers of the fabric in substantially superposed relation, although it is very advantageous to have either no dragging action upon the breast beam or the like, or at least not more than a slight dragging such as is illustrated in Figs. 21, 23 and 24.

My applications Serial Numbers 222,773, and 222,774, both filed April 25, 1951, describe woven-endless belts which may be made from fabrics made in accordance with this invention.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. Means for making tubular fabric and including a concave-curve-beat-up-face production-reed, and constructed and arranged to weave warp strands with endless weft strands at a weave-location to form a tubular production-fabric in which the weft-picks extend transversely to the longitudinal center-line of the tubular production-fabric, and with the tubular production-fabric in flattened form and substantially consisting of two superposed generally flat layers of fabric, and with the corresponding portions of said flat layers in substantially superposed relation at the weave-location; the beat-up face of said concave-curve-beat-up-face production-reed having a curvature which is substantially on a circular arc, a central point of which arc is substantially at the center of a straight weave-tensioned pick at the beat-up face of a straight-beat-up-face test-reed temporarily mounted in weaving position for weaving a test-fabric for determining the locations of two other points on said arc, which said central point is also substantially at the longitudinal center line of said test-fabric, which said two other points on said arc are on opposite sides of said central point, and each of which said two other points is substantially on a first line parallel to said center line, which said first line and center line are spaced apart a distance substantially equal to the distance from said central point, of one end of said straight weave-tensioned pick at the beat-up face of said straight test-reed at the weave-location of said test-fabric while tensioned as being woven, and forward along said first line from said end of said straight weave-tensioned pick at said beat-up face of said straight test-reed, a distance substantially equal to the distance of an end of said pick when relaxed, in said test-fabric when relaxed, along a second line parallel to said center line, back from a line at right angles to said center line and passing through the center of said relaxed pick; and take-up means forward beyond the weave-location, and including two take-up grip members, one grip member being constructed and arranged to grip and pull one said flat layer, and the other grip member being constructed and arranged to grip and pull the other said flat layer, and the take-up means being constructed and arranged to cause said grip members to respectively pull the flat layers of said tubular production-fabric forward away from the weave-location as the fabric is progressively woven, and cause corresponding portions of said flat layers to substantially retain their superposed relation during their travel from the weave-location to a location well forward from said weave-location.

2. Means for making tubular fabric and including a concave-curve-beat-up-face production-reed, and constructed and arranged to weave warp strands with endless weft strands at a weave-location to form a tubular production-fabric in which the weft-picks extend transversely to the longitudinal center line of the tubular production-fabric, and with the tubular production-fabric in flattened form and substantially consisting of two superposed generally flat layers of fabric, and with the corresponding portions of said flat layers in substantially superposed relation at the weave-location; the beat-up face of said concave-curve-beat-up-face production-reed having a curvature which is substantially on a circular arc, a central point of which arc is substantially at the center of a straight weave-tensioned pick at the beat-up face of a straight-beat-up-face test-reed temporarily mounted in weaving position for weaving a test-fabric for determining the locations of two other points on said arc, which said central point is also substantially at the longitudinal center line of said test-fabric, which said two other points on said arc are on opposite sides of said central point, and each of which said two other points is substantially on a first line parallel to said center line, which said first line and center line are spaced apart a distance substantially equal to the distance from said central point, of one end of said straight weave-tensioned pick at the beat-up face of said straight test-reed at the weave-location of said test-fabric while tensioned as being woven, and forward along said first line from said end of said straight weave-tensioned pick at said beat-up face of said straight test-reed, a distance substantially equal to the distance of an end of said pick when relaxed, in said test-fabric when relaxed, along a second line parallel to said center line, back from a line at right angles to said center line and passing through the center of said relaxed pick; and take-up means forward beyond the weave-location, and constructed and arranged to pull the flat layers of said tubular production-fabric forward away from the weave-location as the fabric is progressively woven.

3. Means for making tubular fabric, and constructed and arranged to weave warp strands with endless weft strands at a weave location to form a tubular fabric in which the weft picks extend transversely to the longitudinal center-line of the tubular fabric, and with the tubular fabric in flattened form and substantially consisting of two superposed layers of fabric, and with corresponding portions of the layers in substantially superposed relation at the weave-location; a beat-up reed to the rear of the weave-location and having a concave beat-up face concaved in the forward direction toward the weave-location; and take-up means forward beyond the weave-location and constructed and arranged to grip said layers and pull them forward away from the weave-location at substantially equal speeds as the fabric is progressively woven.

4. Means for making tubular fabric, and constructed and arranged to weave warp strands with endless weft strands at a weave location to form a tubular fabric in which the weft picks extend transversely to the longitudinal center-line of the tubular fabric, and with the tubular fabric in flattened form and substantially consisting of two superposed layers of fabric, and with corresponding portions of the layers in substantially superposed relation at the weave-location; a beat-up reed to the rear of the weave-location and having a concave beat-up face concaved in the forward direction toward the weave-location; and take-up means forward beyond the weave-location and including two take-up rolls each having a curved grip face, one grip face being adapted to grip one said layer, and the other grip face being adapted to grip the other said layer, and said take-up rolls being constructed and arranged to be rotated to cause said grip faces to travel at substantially the same surface speed and grip said layers and pull them forward away from the weave-location at substantially equal speeds as the fabric is progressively woven.

5. The method of making a woven-endless pulley-travel belt including: weaving warp strands with endless weft strands at a weave-location to form a tubular fabric in which the weft picks extend transversely to the longitudinal center-line of the tubular fabric, and with the tubular fabric in flattened form and substantially consisting of two superposed layers of fabric, and with corresponding portions of the layers in substantially superposed relation at the weave location; and gripping said layers and pulling them forward away from the weave-location at substantially equal speeds as the fabric is progressively woven.

6. The method of making a woven-endless pulley-travel belt including: weaving warp strands with endless weft strands at a weave-location to form a tubular fabric having alternate relatively thick and thin tubular portions in which the weft picks extend transversely to the longitudinal center-line of the tubular fabric, and with the tubular fabric in flattened form and substantially consisting of two superposed layers of fabric, and with corresponding portions of the layers in substantially superposed relation at the weave-location; and gripping said layers and pulling them forward away from the weave-location at substantially equal speeds as the fabric is progressively woven.

7. The method of making a woven-endless pulley-travel belt including: weaving warp strands with endless weft strands at a weave-location to form a tubular fabric in which the weft picks extend transversely to the longitudinal center-line of the tubular fabric, and with the tubular fabric in flattened form and substantially consisting of two superposed layers of fabric, and with corresponding portions of the layers in substantially superposed relation at the weave-location; beating up the picks of said layers with a beat-up reed having a concave beat-up face concaved in the forward direction toward said weave-location; and gripping said layers and pulling them forward away from the weave-location at substantially equal speeds as the fabric is progressively woven.

8. The method of making a woven-endless pulley-travel belt including: weaving warp strands with endless weft strands at a weave-location to form a tubular fabric having alternate relatively thick and thin tubular portions in which the weft picks extend transversely to the longitudinal center-line of the tubular fabric, and with the tubular fabric in flattened form and substantially consisting of two superposed layers of fabric, and with corresponding portions of the layers in substantially superposed relation at the weave-location; beating up the picks of said layers with a beat-up reed having a concave beat-up face concaved in the forward direction toward said weave-location; and gripping said layers and pulling them forward away from the weave-location at substantially equal speeds as the fabric is progressively woven.

9. The method of making a woven-endless pulley-travel belt including: weaving warp strands with endless weft strands at a weave-location to form a tubular fabric having alternate relatively thick and thin tubular portions of which the thin tubular portions are single ply and in which the weft picks extend transversely to the longitudinal center-line of the tubular fabric, and with the tubular fabric in flattened form and substantially consisting of two superposed layers of fabric, and with corresponding portions of the layers in substantially superposed relation at the weave-location; beating up the picks of said layers with a beat-up reed having a concave beat-up face concaved in the forward direction toward said weave-location; and gripping said layers and pulling them forward away from the weave-location at substantially equal speeds as the fabric is progressively woven.

GUSTAV WALTERS.

References Cited in the file of this patent

UNITED STATES PATENTS

| Number | Name | Date |
| --- | --- | --- |
| 200,965 | Baker | Mar. 5, 1878 |
| 609,272 | Goodline et al. | Aug. 16, 1898 |
| 685,855 | Meats | Nov. 5, 1901 |
| 1,254,339 | Morgan | Jan. 22, 1918 |
| 2,039,454 | Rossmann | May 5, 1936 |
| 2,373,293 | Cobb | Apr. 10, 1945 |

FOREIGN PATENTS

| Number | Country | Date |
| --- | --- | --- |
| 2,007 | Great Britain | of 1907 |